United States Patent
Bohnert et al.

(10) Patent No.: US 7,373,056 B2
(45) Date of Patent: May 13, 2008

(54) HIGH-VOLTAGE COMPONENT WITH OPTICAL FIBER AND METHOD FOR PRODUCING IT

(75) Inventors: Klaus Bohnert, Oberrohrdorf (CH); Philippe Gabus, Nussbaumen (CH); Hubert Brändle, Oberengstringen (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 10/534,068

(22) PCT Filed: Nov. 6, 2003

(86) PCT No.: PCT/CH03/00729

§ 371 (c)(1),
(2), (4) Date: Feb. 28, 2006

(87) PCT Pub. No.: WO2004/042445

PCT Pub. Date: May 21, 2004

(65) Prior Publication Data

US 2006/0153509 A1    Jul. 13, 2006

(30) Foreign Application Priority Data

Nov. 7, 2002    (EP) ................................. 02405960

(51) Int. Cl.
| | |
|---|---|
| G02B 6/44 | (2006.01) |
| G02B 6/02 | (2006.01) |
| G02B 6/028 | (2006.01) |
| G02B 6/032 | (2006.01) |
| G02B 6/036 | (2006.01) |
| G02B 6/36 | (2006.01) |
| G02B 6/38 | (2006.01) |
| G01J 1/04 | (2006.01) |
| G01J 1/42 | (2006.01) |
| G01J 5/08 | (2006.01) |
| G01J 4/00 | (2006.01) |

(52) U.S. Cl. ............... 385/101; 385/100; 385/123; 385/124; 385/125; 385/126; 385/127; 385/128; 385/53; 385/55; 385/56; 385/58; 385/60; 385/66; 385/68; 250/227.14; 250/227.15; 250/227.16; 250/227.17; 250/227.18; 250/227.19

(58) Field of Classification Search ............... 385/101, 385/53, 55, 56, 58, 60, 66, 68, 100, 123–128; 250/227.14, 227.15, 227.16, 227.17, 227.18, 250/227.19

See application file for complete search history.

(56) References Cited

U.S. PATENT DOCUMENTS 4,802,731 A * 2/1989 Maschek et al. ............ 385/101

(Continued)

FOREIGN PATENT DOCUMENTS

DE    196 33 695    4/1998

(Continued)

OTHER PUBLICATIONS

Bohnert, K et al., "Temperature and Vibration Insensitive Fiber-Optic Current Sensor", Journal of Lightwave Technology, IEEE., Feb. 2002, pp. 267-276, vol. 20, No. 2, New York, US.

(Continued)

Primary Examiner—Brian Healy
Assistant Examiner—Jerry Martin Blevins
(74) Attorney, Agent, or Firm—Buchanan Ingersoll & Rooney PC

(57) ABSTRACT

A high-voltage component, having a first end and a second end, whereby the first end is on a high-voltage potential with respect to the second end. An insulating part, is arranged between the first end and the second end, and an optical fiber is integrated in the high-voltage component and extends from the first end to the second end. A capillary extends from the first end to the second end and is arranged within the insulating part. The inside diameter of the capillary exceeds the outside diameter of the fiber, and the fiber is arranged within the capillary. The capillary includes a protective medium to achieve a dielectric strength in the capillary, which dielectric strength is suitable for the operating conditions.

13 Claims, 1 Drawing Sheet

U.S. PATENT DOCUMENTS

| | | |
|---|---|---|
| 5,594,827 A | 1/1997 | Joulie |
| 5,912,910 A * | 6/1999 | Sanders et al. ............... 372/22 |
| 6,140,810 A * | 10/2000 | Bohnert et al. ............... 324/96 |
| 6,203,647 B1 * | 3/2001 | Schuler et al. .............. 156/171 |
| 6,215,940 B1 | 4/2001 | Johnson |

FOREIGN PATENT DOCUMENTS

| | | |
|---|---|---|
| DE | 100 05 164 A1 | 8/2001 |
| EP | 0 682 261 A2 | 4/1995 |
| EP | 0 856 737 A1 | 12/1997 |
| EP | 0 907 084 | 4/1999 |

OTHER PUBLICATIONS

Juichi Noda et al., "Polarization-Maintaining Fibers and Their Applications," Journal of Lightwave Technology, IEEE, Aug. 1986, pp. 1071-1089, vol. LT-4, No. 8.

* cited by examiner

HIGH-VOLTAGE COMPONENT WITH OPTICAL FIBER AND METHOD FOR PRODUCING IT

This disclosure is based upon European Application No. 02405960.2, filed Nov. 7, 2002, and International Application No. PCT/CH2003/000729, filed Nov. 6, 2003, the contents of which are incorporated herein by reference.

TECHNICAL FIELD

The invention relates to the field of high-voltage technology. It relates to a high-voltage component according to the precharacterising part of claim 1, and to a method for producing a high-voltage component according to the precharacterising part of claim 11.

STATE OF THE ART

In high-voltage technology there are a number of applications in which a large electrical potential difference needs to be bridged with optical fibers. This is, for example, the case in communication systems in high-voltage plants or in fiber-optic sensors such as current sensors, voltage sensors and temperature sensors in the field of high-voltage. Part of the sensor, namely the sensor head, is usually on a high-voltage potential. A light source as well as an electronic detection system of the sensor are usually on earth potential. The connecting fibers between these components, which are on different electrical potentials, have to be installed such that no instances of electrical breakdown can occur. Electrical breakdown or discharge can occur in the case of inexpert installation, for example due to soiling of the fiber itself or of a fiber cable that surrounds and mechanically protects said fiber. In particular, high dielectric strength can only be achieved if during installation of the optical fibers no substantial hollow spaces are generated within the high-voltage component, and if during the projected service life of the high-voltage component no such hollow spaces arise. Depending on the operating voltage, for alternating voltages a dielectric strength for example of up to 500 kV and beyond for permanent exposure, and a dielectric strength for example of up to approximately 2 MV for temporary voltage spikes must be ensured.

U.S. Pat. No. 5,594,827 describes the installation of optical fibers in a high-voltage insulator. The high-voltage insulator comprises an inner, rod-shaped insulation body which typically comprises fiber-reinforced plastic. There is a spiral-shaped groove in the surface of the insulation body, which groove leads from a first end to a second end of the insulation body, wherein the fiber is placed in said groove. Furthermore, the surface of the insulator comprises shielding made from an elastomer, typically silicon, which shielding significantly increases the creeping distance between the high-voltage potential and the earth potential. The fiber is pressed into the elastomer, and as a result of this is coated by the elastomer.

U.S. Pat. No. 6,215,940 discloses a further high-voltage insulator with an optical fiber, which high-voltage insulator forms the precharacterising parts of claims 1 and 11. In this design, the rod-shaped insulation body is enclosed by a shrinkdown sleeve which surrounds the spiral-shaped fiber that is wound around the insulation body and pushes said fiber against the insulation body. Moreover, the fiber is surrounded by a silicon gel in order to avoid hollow spaces within the shrinkdown sleeve so that improved dielectric strength is achieved. For softer embedding of the fiber, the insulator can be coated with an inner intermediate layer made of an elastomer.

EP 0,856,737 A1 discloses a magneto-optic current sensor. This current sensor comprises a sensor head with an optical fiber as a sensor coil. This optical sensor fiber is used to guide circular-polarised light. The optical sensor fiber comprises a magneto-optically active material; the linear double refraction of said fiber must only be very low. Generally speaking, optical fibers comprise a fiber coating that usually comprises an acrylate. During temperature changes, this fiber coating can slightly deform, thus exerting slight loads onto the fiber. In the case of fibers without intrinsic double refraction, such as the above-mentioned sensor fiber, this can result in an uncontrolled slight double refraction of the fiber, as a result of which the circular-polarised waves propagated in the sensor fiber, and thus the measuring signal of the current sensor, are affected.

The above-mentioned EP 0,856,737 A1 proposes that the fiber be freed of its fiber coating so as to eliminate the above-mentioned undesired influences on the measuring signal. Furthermore, in order to also eliminate any mechanical stress which may still be present in the bare fiber, which stress could also lead to an undesirable temperature dependence of the measuring signal, and in order to practically render the fiber free of any double refraction, the sensor fiber is annealed at approximately 830° C., having been wound as a coil. A bare fiber, free of its fiber coating, is extremely sensitive even to minute mechanical forces and also to chemical influences and furthermore to water vapour diffusing into the fiber, the latter being able to render the fiber brittle. According to the above-mentioned EP 0,856,737 A1 such a highly sensitive bare fiber is inserted into a capillary which assumes the function of the fiber coating. To protect the sensor fiber against humidity and/or chemically aggressive gases, the capillary is closed off so as to be gas-proof and is filled with a protective gas. In order to provide improved mechanical protection to the sensor fiber and in order to be able to handle the sensor safely, the capillary, which measures only a few hundred micrometers in diameter, is cast in a casting compound. Even during operation of such a current sensor, neither the sensor fiber nor the capillary bridges any potential difference.

The above-mentioned high-voltage insulators are associated with a disadvantage in that the choice of optical fibers that can be used in them is severely limited because the material of the fiber coating has to be compatible with the (elastomer) material that encloses it. For, if the adhesive properties between the fiber coating material and the enclosing (elastomer) material are not good, separation of the materials occurs, and thus hollow spaces occur which result in instances of partial discharge and breakdown. Already during the production of such a high-voltage component it is not always possible to reliably prevent larger hollow spaces from forming, hence it is not possible to ensure adequate dielectric strength. Furthermore, polarisation-maintaining fibers, whose optical properties can be changed by exposure to major forces, are not optimally protected against the influences of such forces. The elastomer material would exert forces on the fibers, which forces are excessive in the context of polarisation-maintaining fibers. In this case, safe transmission of polarised light is thus not ensured.

PRESENTATION OF THE INVENTION

It is thus the object of the present invention to create a high-voltage component of the type mentioned in the introduction, which component does not have the above-mentioned disadvantages. Furthermore, it is the object of the invention to create a respective production process for such a high-voltage component. In particular, the high-voltage component is to be suitable for use with any optical fibers, irrespective of the material and the type of the fiber or of the fiber coating, while nonetheless featuring a long service life.

This object is met by a high-voltage component with the characteristics of claim 1, and a production method according to claim 11.

The high-voltage component according to the invention with a first end and a second end, wherein under operating conditions the first end is on a high-voltage potential with respect to the second end, comprising an insulating part, which is arranged between the first end and the second end; and comprising an optical fiber, which is integrated in the high-voltage component and which extends from the first end to the second end, is characterised in that the high-voltage component comprises a capillary, which extends from the first end to the second end and which is arranged within the insulating part;

the inside diameter of the capillary exceeds the outside diameter of the fiber;

the fiber is arranged within the capillary; and the capillary comprises a protective medium to achieve a dielectric strength in the capillary, which dielectric strength is suitable for the operating conditions.

The high-voltage component according to the invention thus comprises a capillary for accommodating the optical fiber, wherein the capillary is arranged within the insulating part of the high-voltage component and is filled with a protective medium so as to provide high dielectric strength. Typically, the insulating part can be some form of shielding, for example made of silicon.

As a result of the above, the fibre is not exposed to direct contact with materials of the insulating part so that the type of fiber and the type of fiber coating can be selected irrespective of the materials of the insulating part. In spite of this, high dielectric strength is achieved. Hollow spaces and instances of breakdown near fibers can be prevented very well. Furthermore, the fiber is very well protected against large thermomechanical forces exerted by the insulating part. Such forces are caused by different coefficients of expansion of the materials exposed to temperature fluctuations, for example the diurnal temperature range or the seasonal temperature range. Losses of light, when guiding light within the fiber 4, as a result of such forces, also known as microbending effects, are avoided or at least reduced.

In a preferred embodiment of the object of the invention, the outside of the capillary is enclosed by a capillary coating. The latter preferably comprises a temperature-resistant material. This provides mechanical protection to the capillary. Any forces that are exerted onto the capillary are distributed more evenly over the capillary and are weakened. The capillary coating is used to provide mechanical protection to the capillary, including during installation in the high-voltage component. The capillary coating achieves improved operational safety and a longer service life.

In a further preferred embodiment of the object according to the invention, the capillary is designed and arranged in the insulating part such that thermo-mechanical stress leaves the capillary undamaged. Such thermo-mechanical stress is above all thermo-mechanical stress which the insulating part exerts on the capillary in operation or during the curing process of the insulation part. This can be achieved by a corresponding selection of the material, the thickness of the material, and the geometry, in particular the wall thickness of the capillary, as well as by suitable installation of the capillary in the insulating part. Excellent operational safety and a long service life are achieved in this way.

In a further preferred embodiment of the object according to the invention the fiber is a polarisation-maintaining fiber. In particular, the fiber comprises an elliptic core or an inner elliptic jacket, or else the fiber is a bowtie fiber or a panda fiber. Due to their strong intrinsic double refraction, such fibers maintain to a large extent the polarisation of linear polarised lightwaves propagating within them. In various applications, information is encoded in the polarisation state of the lightwaves. In particular in sensor technology, disturbance-free transmission of the polarisation state is important to the stability of sensor signals. Any disturbance of the polarisation state is undesirable. The exertion of strong external mechanical forces on a polarisation-maintaining fiber can lead to changes in the double refraction of the fiber so that its polarisation-maintaining characteristics are impeded and the above-mentioned disturbance during signal transmission can occur. Such an effect of forces can be prevented by means of the capillary. Safe transmission of polarised light and of any information coded accordingly is thus ensured.

In a further preferred embodiment of the object of the invention the fiber comprises a fiber coating which protects the fiber against any undesirable chemical and mechanical influences. As a result of the arrangement of the fiber within the capillary, a fiber-coating material can be selected without having to take into account its compatibility with materials of the insulating part, above all in relation to surface characteristics and adhesive characteristics.

In a further preferred embodiment of the object of the invention the fiber is exchangeable without there being any need to change the insulating part. This makes possible a more flexible use of the high-voltage component and also improves its repairability.

In a further preferred embodiment of the object of the invention the high-voltage component comprises an insulation body along which the capillary is arranged in a spiral shape (helical shape). Typically, the insulation body can be a rod-shaped glass fiber-reinforced epoxy body which interconnects two ends of the high-voltage component, wherein a fitting is arranged at each end. The insulation body is used for mechanically stabilising the high-voltage component. The capillary is arranged outside or inside the insulation body such that, there, it essentially describes a spiral track which essentially leads along a surface of the insulation body from the first end to the second end. In this way improved dielectric strength can be achieved. Furthermore, a prolongation of the service life of the high-voltage component is achieved because, as a result of its spiral-shaped arrangement, the capillary is exposed to mechanical loads that are less severe.

The capillary can be in direct contact with the insulation body; as an alternative an intermediate layer can be provided between the insulation body and the capillary, wherein said intermediate layer is advantageously soft, i.e. of a low shore hardness. This also leads to a less severe mechanical load on the capillary, and consequently to an increase in the service life of the high-voltage component. Advantageously, the insulation body is wrapped in the intermediate layer before the capillary is arranged on the insulation body.

In a further preferred embodiment of the object of the invention the high-voltage component comprises a current sensor and/or a voltage sensor. They can for example operate electro-optically, magneto-optically or piezo-optically. Using sensor integration, it is possible to implement a high-voltage component that is improved because it comprises integrated sensor technology functions. In particular, fiber-optic sensors are advantageous because transmission of optical signals is very easy to implement thanks to the optical fiber and the capillary.

In further preferred embodiments of the object of the invention the insulating part is a form of shielding and/or an insulation filler and/or an insulation body. The method, according to the invention, for the manufacture of a high-voltage component comprising a first end and a second end, wherein under operating conditions the first end is on a high-voltage potential with respect to the second end, and comprising an insulating part which is arranged between the first end and the second end, is characterised
in that between the first end and the second end within the insulating part a capillary for accommodating an optical fiber is arranged; and
in that a protective medium is placed in the capillary for achieving a dielectric strength in the capillary, which dielectric strength is suitable for the operating conditions.

Thus, a capillary is placed in the insulating part, wherein the capillary is suitable for accommodating an optical fiber. Furthermore, a protective medium is placed in the capillary, which protective medium is suitable for achieving a dielectric strength suitable for the operating conditions.

In this way, an operationally safe high-voltage component can be produced which can be equipped with an optical fiber, wherein the fiber is not exposed to direct contact with materials of the insulating part of the high-voltage component, so that the type of the fiber and the type of the fiber coating can be selected independently of the materials of the insulating part.

In a preferred embodiment of the production method according to the invention the fiber is placed in the capillary. In this way it is possible to produce a high-voltage component which provides good dielectric strength and which has been improved with the function of optical signal transmission. Since the fiber is not exposed to direct contact with any materials of the insulating part of the high-voltage component, the material of the fiber can be selected independently of the material of the insulating part.

In a further preferred embodiment of the production method according to the invention the capillary is wrapped on the outside in a capillary coating before the capillary is arranged within the insulating part. As a result of this, the capillary is mechanically protected, and complete radial wrapping of the capillary is achieved in a simple way. Any forces exerted on the capillary are distributed more evenly over the capillary and are thus weakened. Better operational safety and a prolonged service life are achieved.

In a further preferred embodiment of the production method according to the invention the capillary is arranged within the insulating part already prior to a curing process of the insulating part taking place. In this way favourable production can be achieved which is suitable for many high-voltage components because standard processes such as the curing of the insulating part can be used. Furthermore, the capillary is fixed in the insulating part in a mechanically secure way. The fiber can be placed in the capillary either before or after the curing process of the insulating part.

High-voltage components can be implemented which provide good dielectric strength and a long service life, which high-voltage components can comprise optical fibers for signal transmission, wherein the selection of the material of the fibers can be made independently of the material of the insulating part.

Further preferred embodiments and advantages are shown in the independent claims and in the figures.

BRIEF DESCRIPTION OF THE DRAWINGS

Below, the object of the invention is explained in more detail with reference to preferred embodiments shown in the enclosed drawings, as follows.

Figure 1:
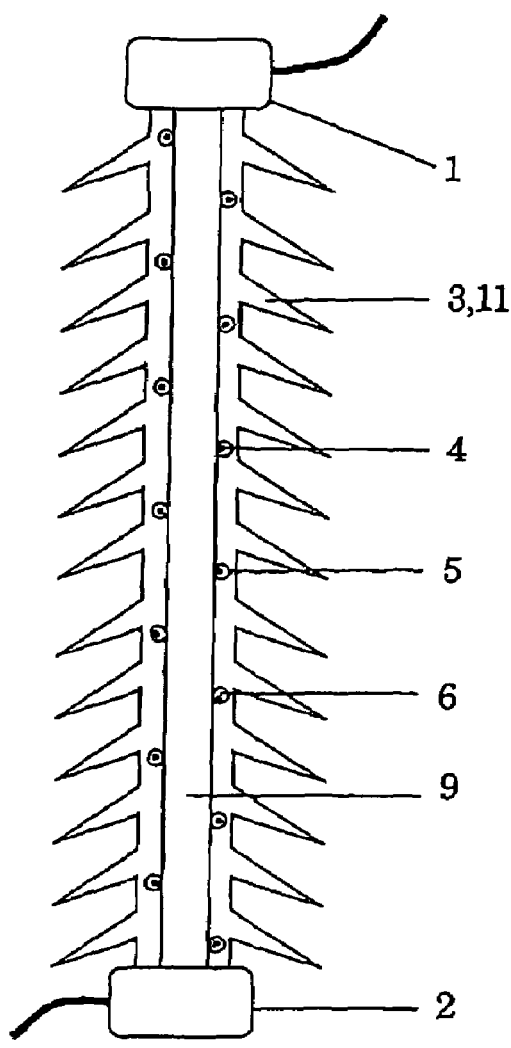
FIG. 1 a diagrammatic section view of a high-voltage insulator.

The reference numbers used in the drawings and their designations are presented in the list of reference numbers. In principle, identical parts, or at least parts with an identical function, have the same reference numbers in the drawings. The exemplary embodiments described are examples of the object according to the invention; they have no limiting effect whatsoever.

WAYS OF IMPLEMENTING THE INVENTION

FIG. 1 diagrammatically shows a section view of a high-voltage component according to the invention. The high-voltage component is a high-voltage insulator comprising a first end 1 and a second end 2. Under operating conditions the first end 1 is on an electrical high-voltage potential, while the second end 2 is on earth potential. The two ends 1, 2 comprise fittings. Between the ends 1, 2 an insulation body 9 is arranged which has the shape of a cylindrical rod. Such an insulator rod 9 is used to space apart, so as to electrically insulate them, the two ends 1, 2, which are on different electrical potentials, and to provide mechanical stabilisation to the arrangement. Preferably, said insulator rod 9 is made from a fiber-reinforced artificial resin, in particular a fiber-reinforced epoxy resin.

The insulator rod 9 is enclosed by an insulating part 3, which in the embodiment shown is identical to a form of shielding 11. Typically, the shielding 11 is made from silicon. It is used to extend the creeping distance, which is desirable in particular in the case of high-voltage components which are exposed to the weather. The insulating part 3 comprises a capillary 5, which advantageously is wound around the insulator rod 9 in the shape of a helix or spiral. Advantageously, the capillary 5 encloses the insulator rod 9 in a coil shape or spiral shape. Said capillary 5 is preferably made from quartz glass. Advantageously, the capillary is constructed and arranged in the insulating part in such a way that the thermo-mechanical stress which under operating conditions is exerted on it by the insulating part leaves it undamaged. This can be achieved by a corresponding selection of materials, and in that the geometry of the capillary, in particular its wall thickness, is selected accordingly. Preferably, the capillary 5 has a round cross section.

An optical fiber 4 is arranged within the capillary 5. The fiber 4 is used for optical transmission of information by way of a high-voltage potential. Further-reaching cables are indicated on the fittings at the ends 1, 2. Apart from the fiber 4, the capillary 5 also contains a protective medium 6. The protective medium 6 is used to increase the dielectric strength of the high-voltage component. For this purpose, for example, dry nitrogen or a transformer oil, or dielectric gel such as silicon gel, can be used. To prevent the protective medium 6 from escaping from the capillary 5, the ends of said capillary 5 are closed (not shown). Sealing the ends of the capillary 5 also prevents moisture from entering the capillary 5, which is advantageous since ingressing moisture could not only reduce the dielectric strength but could also attack the capillary from inside. However, a capillary 5 which is not closed is also imaginable, in particular if the fiber 4 comprises a fiber coating, and if high ambient humidity cannot enter the capillary 5.

To produce the high-voltage insulator shown in FIG. 1, if necessary, first attachment means for the fittings are provided at the ends 1, 2 of the insulation body 9. After this, the optical fiber 4 is inserted into the capillary 5. Thereafter, the capillary 5 is coiled around the insulation body 9 so that said capillary extends from the first end 1 to the second end 2. If necessary, the capillary is additionally fixed to the insulation body 9. Then, advantageously, the protective medium 6 is placed in the capillary, and the capillary is closed so as to be gas-proof. After this, the insulator rod 9, including the capillary 5 containing the fiber 4, is placed in a preferably evacuated casting mould (not shown), which is then filled with liquid silicon for the shielding 11 in a way in which inclusions of air are prevented. After this, the silicon has to be cured; a process which typically takes place by heating it to approximately 150° C. for approximately 30 minutes. Very considerable thermo-mechanical stress arises in the high-voltage component during such a heating process, and above all during the subsequent cooling process. If necessary, filling the protective medium 6 can take place following the casting of the insulation body 9 and the capillary 5 with the shielding material.

The length of a high-voltage component depends on the voltage for which said high-voltage component is designed. For example, if the voltage drop between the first end 1 of a high-voltage component and the second end 2 is to be 145 kV, a length between the two ends 1, 2 of approximately 1.4 m is selected.

Figure 2:
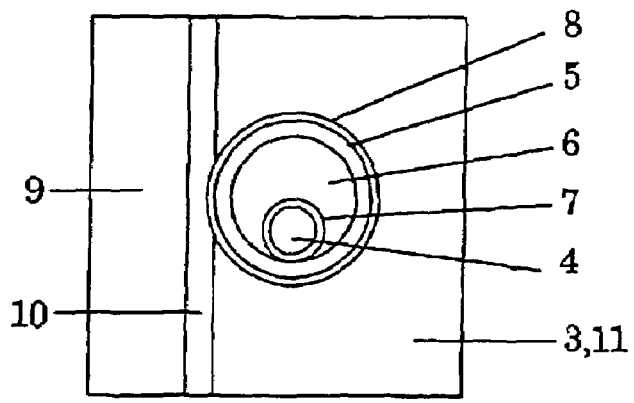
FIG. 2 a detailed diagrammatic section view of the capillary region of a high-voltage component.

FIG. 2 is a detailed diagrammatic section view of a high-voltage component which is similar in design to the component shown in FIG. 1. An intermediate layer 10 made of a soft plastic, for example silicon, is arranged between the insulation body 9 and the insulating part 3 which is used as shielding 11. The intermediate layer 10 serves to reduce thermo-mechanical stress acting on the capillary 5. A capillary coating 8 also serves to provide mechanical protection to the capillary 5. Said capillary coating 8 wraps the capillary 5 lengthwise. It comprises a dielectric, preferably a polyimide. Its wall thickness is typically between 5 µm and 50 µm. Furthermore, the capillary coating 8 also serves to improve the adherability of the capillary 5 (or more precisely the capillary coating 8) with the material enclosing it, i.e. the material from which the insulating part 3 is made. Furthermore, it is advantageous if the capillary coating is selected such that when it is cast in the material of the insulating part it has good wetting characteristics so that contact surfaces are created which are free of any hollow spaces. With a suitable combination of the material of the capillary coating 8 and the material of the insulating part 3, a safe connection between the capillary 5 and the insulating part 3 surrounding it can be created, which connection is free of any hollow spaces and which has a long service life while providing good dielectric strength. Any inclusion of hollow spaces must be avoided during the production process, and it must further be ensured that the connections within the high-voltage component cannot become separated over time, wherein such separation would form hollow spaces which could lead to incidents of partial discharge.

When compared to high-voltage components comprising integrated fibers as they are known from the state of the art, a design comprising a capillary 5 provides a great advantage in that the material of the fiber 4, or of the fiber coating 7 enclosing the fiber 4, can be freely selected. The fiber 4 or the type of the fiber 4 can thus be selected independently of the materials of the high-voltage component. The material of the capillary 5 or the material of the capillary coating 8 can be optimised in relation to good mechanical protection of the capillary 5 and/or in relation to good adhesive properties with the surrounding material (insulating part 3). If necessary, a bonding agent (primer) can be used to further improve the adhesive properties. Such a primer can be applied to the intermediate layer 8 prior to embedding the capillary 5 in the insulating part 3.

Advantageously, the high-voltage component is designed in such a way that the fiber 4 is exchangeable. The fiber 4 should in particular be exchangeable without the insulating part 3 having to be changed. This can be achieved by means of the capillary 5 in that the protective medium 6 is either of adequately low viscosity or can, in whole or in part, be removed from the capillary 5 so that the sliding friction between the capillary 5 and the fiber 4 is sufficiently low to make it possible to withdraw the complete fiber 4 from the capillary 5. Any closures or seals at the ends of the capillary must be removable. Furthermore, a new fiber 4 must be insertable into the capillary 5, which is located in the insulating part 3. To achieve a sliding friction that is sufficiently low for withdrawal and/or insertion, a suitable protective medium 6 can be used, as can a liquid which reduces sliding friction, for example an oil or alcohol. Moreover, not too small a helix angle of the capillary helix facilitates a change of fiber. In particular, the insertion of a new fiber 4 into the capillary 5 can be simplified in that prior to removal of the original fiber 4, the new fiber 4 is connected to one end of the original fiber 4, for example by splicing, so that as the original fiber 4 is withdrawn, the new fiber 4 is at the same time pulled into the capillary 5.

Generally speaking, optical fibers 4 comprise a fiber coating 7, which typically comprises an acrylate. Some fibers 4 comprise fiber coatings 7 made of a high-temperature resistant material, such as polyimide or Teflon. Tests have shown that in the case of an arrangement with a capillary 5, the more commonly used acrylate coated fibers 4 can be used despite bake-out temperatures of approximately 150° C. for the silicon shielding 11, 3. Often, special fibers are only available with an acrylate coat 7, but not with a special high-temperature resistant fiber coating 7. Preferably and advantageously, acrylate-coated fibers 4 are thus used.

Figure 3:
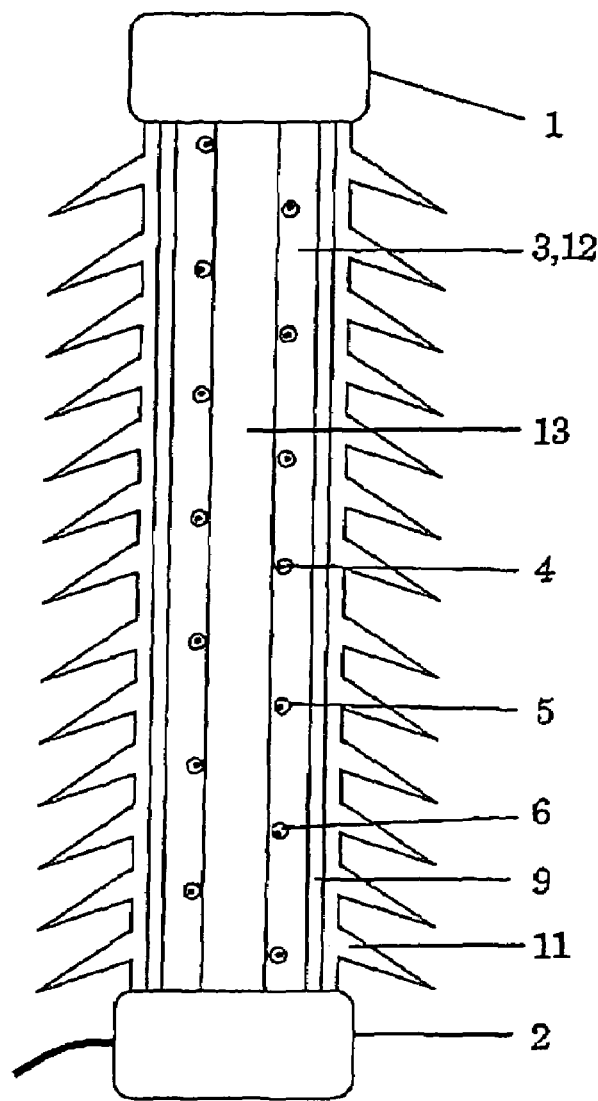
FIG. 3 a diagrammatic section view of a high-voltage insulator with an electro-optical voltage sensor.

FIG. 3 is a diagrammatic section view of a further preferred embodiment of the object of the invention. The high-voltage component is a high-voltage insulator comprising shielding 11 and an integrated electro-optical or piezo-optical voltage sensor 13. An insulation body 9 is arranged between the two ends 1, 2, each of which comprises a fitting. Said insulation body 9 is made from a dielectric, preferably from a fiber-reinforced plastic. The insulation body 9 essentially has the shape of a hollow cylinder. The optional shielding 11 is arranged on the outside of the insulation body 9 so as to enclose it. The electro-optical or piezo-optical voltage sensor 13 is arranged centrally in relation to the longitudinal axis of the high-voltage insulator. The capillary 5, together with the protective medium 6 and the fiber 4, and if necessary with a capillary coating 8 (not shown in FIG. 3), is arranged in a spiral shape around the voltage sensor 13. Advantageously, the voltage sensor 13 can comprise an intermediate layer 10 as shown in FIG. 2. A detection unit (not shown) of the voltage sensor 13 can advantageously be arranged in a fitting of the high-voltage component, in particular in a fitting arranged on earth potential. In order to produce the high-voltage component, advantageously the capillary 5, which already contains the fiber 4, is coiled around the voltage sensor.

An insulation filler 12 is arranged between the insulation body 9 and the voltage sensor 13. In this arrangement the insulation filler 12 thus serves as an insulating part 3, with the capillary 5 being embedded in said insulation filler 12. Advantageously, the insulation filler 12 is a solid material insulation, for example made of polyurethane. However, it can also be some other dielectric, such as for example an insulating liquid, for example silicon oil or transformer oil, or an insulating gas, such as $SF_6$, which is preferably pressurised. Preferably the voltage sensor 13 is only enclosed in the insulation filler 12 after the capillary has already been arranged around the voltage sensor 13.

Advantageously, the voltage sensor 13 can be designed in the way disclosed in published application EP 0,682,261 A2 or in published application EP 0,907,084 A2. The disclosure content of these publications is herewith expressly incorporated in the description. Advantageously, the fiber 4 can be used for transmitting light to the sensor. In the case of a voltage sensor according to the above-mentioned EP 0,907,084 A2, advantageously the light transmission between the quartz components of the sensor can take place by means of fibers 4 in capillaries 5. In addition, or as an alternative, to the voltage sensor 13, the high-voltage component (for example the component shown in FIG. 3, and additionally the one shown in FIG. 1) can also comprise an optical current sensor (not shown). A current sensor, or at least the sensor head thereof, can advantageously be arranged on the first end 1 or on the second end 2 of the high-voltage component; however, said current sensor or sensor head can also be arranged in between. Advantageously, the transmission of light from the sensor takes place by means of the fiber 4 in the capillary 5. In K. Bohnert et al., Temperature and vibration insensitive fiber-optic current sensor, J. Lightwave Technology, 20 (2), 267-276, (2002) various suitable optical current sensors are disclosed. The document with its entire disclosure content is thus incorporated in the description.

If a high-voltage component which is similar to the one shown in FIG. 3 is not to comprise a voltage sensor, then the capillary 5 can nevertheless be arranged within an insulating part 3 within the insulation body 9. For example, by means of an auxiliary mechanical structure (not shown), the capillary 5 can be made to assume an approximate coil shape, and an insulating part 3 or an insulation filler 12 can be put into place.

The alternative or additional characteristics stated above and described below can optionally be combined, as desired, with each other as well as with the exemplary embodiments presented in the description.

As shown in FIGS. 1 and 3, the high-voltage component can be a high-voltage insulator. However, the high-voltage component can also be a high-voltage leadthrough, a high-voltage arrester or a high-voltage switch. Advantageously, the high-voltage component can comprise a current sensor and/or a voltage sensor 13. For example, the published application DE 100,05,164 A1, whose disclosure content is herewith expressly incorporated in the description, discloses various high-voltage leadthroughs, current sensors and/or voltage sensors and several advantageous arrangements of current sensors and/or voltage sensors in high-voltage leadthroughs. Advantageously, an optical fiber 4 and capillary 5 can be integrated in the manner according to the invention in such types of high-voltage leadthroughs. The high-voltage component need not necessarily comprise an optical fiber; instead it can merely be suitable for accommodating an optical fiber 4 in the capillary 5. The voltages which nominally occur in the field of high-voltage technology typically range from 50 kV to 1000 kV, in particular 75 kV, 125 kV, 175 kV, 240 kV, 550 kV and 800 kV.

Under operating conditions, in most cases one end 2, 1 will be on earth potential, and the other end 1, 2 on a high-voltage potential. However, high-voltage components and arrangements are also imaginable in which both ends 1, 2 are on a high-voltage potential each, wherein nevertheless a high-voltage potential is present between the two ends 1, 2. Operating conditions not only comprise the nominal voltages which in general are permanently present at the high-voltage component, but also comprise the voltage spikes, which occur in the case of malfunctions such as short circuits, which voltage spikes a high-voltage component is designed to handle.

On at least one end 1, 2, the high-voltage component advantageously comprises at least one fitting. This fitting can be provided for accommodating the ends of the capillary 5 and, if need be, also for accommodating the ends of the fiber 4. Moreover, within and/or without the fitting, of which there is at least one, connections for further electrical connections or fiber connections can be provided, for example plug connections or splice connections. On at least one end 1, 2, advantageously at least one connection for high-voltage and/or for at least one optical fiber is provided, wherein advantageously said connection is integrated in a fitting.

The ends 1, 2 can, but do not have to, match the geometric ends of the high-voltage component. It is not necessary for the maximum voltage at the high-voltage component to be present between the ends 1, 2, which are given in that between them a high-voltage potential is present and in that the fiber extends (at least) between them; instead, a partial voltage can be present between said ends 1, 2.

The insulating part 3 can be any dielectric which extends between the two ends, in which dielectric the capillary 5 is integrated. For example, the insulating part can be a rod shaped (FIG. 1) or a tubular (FIG. 3) dielectric body, or it can be a liquid or a gas. For example, it can be an insulation body 9, a form of shielding 11 (FIG. 1) or an insulation filler 12 (FIG. 3).

The optical fiber 4 is used to transmit signals. This may be in the fields of communication and telecommunication, or also in the fields of security technology or process control technology, and in particular in the field of sensor technology. The transmission of light, in particular of polarised light, from current sensors, voltage sensors and/or temperature sensors is particularly advantageous. Advantageously, the fiber 4 comprises a fiber coating 7; however, it is also imaginable that fibers 4 without fiber coating 7 are used. Preferably, polarisation-maintaining fibers 4, in particular fibers 4 which are polarisation-maintaining due to their geometry, are used. In J. Noda et al., Polarisation maintaining fibers and their applications, J. Lightwave Technology, 4 (8), 1071-1089 (1986) various polarisation-maintaining fibers are disclosed which can be used in a high-voltage component according to the invention. The above-mentioned publication is therefore expressly incorporated into the disclosure content of the present patent application. Preferably, in particular, fibers with an elliptic core, fibers with an inner elliptic jacket, bowtie fibers or panda fibers are used.

The fiber 4 is arranged in the high-voltage component such that under operating conditions a part of the fiber 4 is on a high-voltage potential in relation to another part of the fiber 4. Advantageously, the fiber 4 and the capillary 5 describe an essentially helical path from the first end 1 to the second end 2. Such an arrangement reduces the effect of thermomechanical forces on the capillary 5. Moreover, in particular in the case of small leads and thus small angles of rise of the helix described by the capillary 5, wherein the angle if at all possible is less than 90° or less than 60°, the space between the exterior of the fiber 4 and the interior of the capillary 5, which space is to be filled by the protective medium 6, becomes small in the direction parallel to the electrical field lines. In this way a high limiting field strength is achieved, above which partial discharges might occur within the capillary 5. The fiber 4 can also extend beyond one end or both ends 1, 2. Instead of a single fiber 4, several fibers 4 can be arranged in a capillary 5; preferably to provide redundancy and/or for transmitting several different signals, for example a sensor signal each, of three alternating-current phases. Typically, the diameter of a fiber 4 ranges from 50 μm to 200 μm, usually from 75 μm to 140 μm.

Advantageously, the capillary 5 is made from a quartz glass or some other glass. Advantageously, the coefficient of thermal expansion of the capillary is essentially the same as that of the fiber 4. However, capillaries 5 made of a plastic material, for example polyimide, Teflon or polyethylene are also imaginable. Preferably, the capillary 5 comprises a capillary coating 8, as described above. Advantageously, the capillary 5 is arranged on the outer surface of the insulation body 9 or in said insulation body 9, in particular on an inner surface of the insulating body 9. Advantageously, an intermediate layer 10 is arranged between the capillary 5 and the insulation body 9. In order to provide redundancy or to transmit larger data volumes, several capillaries can be integrated in a high-voltage component. Typical inside diameters and outside diameters of capillaries (without a capillary coating 8) are several 100 μm, for example 200 μm to 600 μm. In this arrangement the wall thickness is typically between 20 μm and 80 μm. Advantageously, the ends of the capillary can be closed off (so as to be gas-proof). Advantageously, the high-voltage component comprises several capillaries 5. This can for example be the case so as to provide redundancy, and/or for transmitting various signals. In particular for the transmission of sensor signals, advantageously three or six capillaries 5 can be provided, wherein in such an arrangement a set of three capillaries 5 each serves to accommodate one or several fibers 4 for transmitting sensor signals of various alternating-current phases.

The protective medium 6 is a gaseous or a liquid dielectric. Advantageously, the protective medium 6 has a small coefficient of thermal expansion. Preferably, dry nitrogen or silicon oil or $SF_6$ is used. The protective medium 6 can be placed into the capillary before, or preferably after, placement of the fiber 4. In special cases, air or a vacuum, can serve as a possible protective medium 6. If the humidity of the air is not unusually high, the ambient air can serve as a protective medium 6, and the capillary 5 can be left open. The protective medium is used to prevent instances of partial discharge within the capillary.

The capillary coating 8 can comprise several layers. The capillary coating 8 can be provided to the capillary 5 before or after arrangement of the capillary 5 in the insulating part 3. Typically, the wall thickness of a capillary coating 8 is several 10 μm, for example between 20 μm and 80 μm. The insulation body 9 can be rod-shaped, tubular, prism-shaped, or curved. It is possible for the insulation body 9 at the same time to be the insulating part 3. Advantageously, the insulation body 9 can comprise a groove in which the capillary 5 is installed. Details of such an arrangement are provided in the above-mentioned printed publication U.S. Pat. No. 5,594,827 whose disclosure content is herewith expressly incorporated in the description. The above-mentioned characteristics can be advantageous together or individually, or in any desired combination.

LIST OF REFERENCE NUMBERS

1 First end
2 Second end
3 Insulating part
4 Optical fiber
5 Capillary
6 Protective medium
7 Fiber coating
8 Capillary coating
9 Insulation body, insulator rod
10 Intermediate layer
11 Shielding
12 Insulation filler
13 Voltage sensor

The invention claimed is:

1. A high-voltage component comprising;
a first end and a second end, wherein under operating conditions the first end is on a high-voltage potential with respect to the second end;
an insulating part, which is arranged between the first end and the second end; and
at least one optical fiber, which is integrated in the high-voltage component and which extends from the first end to the second end, wherein the high-voltage component comprises:
at least one capillary, which extends from the first end to the second end and which is arranged within the insulating part, wherein:
the capillary has an inside diameter that exceeds the outside diameter of the fiber,
the fiber is arranged within the capillary,
the capillary has a protective medium to achieve a dielectric strength in the capillary, which dielectric strength is suitable for the operating conditions,
the outside of the capillary is enclosed by a capillary coating in order to protect said capillary against mechanical stress,
the capillary is designed and arranged in the insulating part such that thermo-mechanical stress, which the insulating part exerts on the capillary during the curing process of the insulation part, leaves it undamaged, and
a current sensor and/or voltage sensor operating electro-optically, magneto-optically or piezo-optically, in that the fiber is a polarization-maintaining fiber.

2. The high-voltage component according to claim 1, wherein the capillary is designed and arranged in the insulating part such that thermo-mechanical stress, which under operating conditions is exerted on said capillary by the insulating part, leaves it undamaged.

3. The high-voltage component according to claim 1, wherein the fiber comprises a fiber coating.

4. The high-voltage component according to claim 1, wherein the fiber is exchangeable without there being any need to change the insulating part.

5. The high-voltage component according to claim 1, wherein the high-voltage component comprises an insulation body which extends from the first end to the second end, wherein the insulation body differs from the insulating part wherein the capillary is arranged in a spiral shape along the insulation body, and in particular wherein the insulation body is wrapped by an intermediate layer, and the intermediate layer is arranged between the insulation body and the capillary.

6. The high-voltage component according to claim 1, wherein the insulating part is a form of shielding and/or an insulation filler and/or an insulation body.

7. The high-voltage component according to claim 1, wherein the high-voltage component is a high-voltage insulator, a high-voltage leadthrough, a high-voltage arrester or a high-voltage switch.

8. The high-voltage component according to claim 1, wherein the fiber is a fiber comprising an elliptic core, a fiber comprising an inner elliptic jacket, a bowtie fiber or a panda fiber.

9. A method for producing a high-voltage component comprising a first end and a second end, wherein under operating conditions the first end is on a high-voltage potential with respect to the second end, the method comprising:

arranging an insulating part between the first end and the second end; and arranging at least one capillary within the insulating part between the first end and the second end to accommodate at least one optical fiber wherein:

the at least one fiber is placed in the capillary, a protective medium is placed in the capillary to achieve a dielectric strength in the capillary, which dielectric strength is suitable for the operating conditions, and a capillary coating is selected such that, when it is cast in the material of the insulating part, it has good wetting characteristics and it is applied to the outside of the capillary before the capillary is arranged with the insulating part.

10. The production method according to claim 9, wherein the high-voltage component comprises an insulation body which extends from the first end to the second end, wherein the insulation body differs from the insulating part wherein the capillary is arranged in a spiral shape along the insulation body, and in particular wherein the insulation body is wrapped by an intermediate layer, and then the capillary is arranged in a spiral shape along the insulation body, which is wrapped by the intermediate layer, so that the intermediate layer is arranged between the capillary and the insulation body.

11. The production method according to claim 9, wherein the capillary is arranged within the insulating part prior to a curing process of the insulating part taking place.

12. The production method according to claim 9, wherein the fiber is placed in the capillary before the capillary is arranged within the insulating part.

13. The production method according to claim 9, wherein the fiber is placed in the capillary after the capillary is arranged within the insulating part, and/or wherein the fiber is placed in the capillary in such a way that it is exchangeable.

* * * * *